United States Patent [19]

Chauquet

[11] Patent Number: 5,749,671
[45] Date of Patent: May 12, 1998

[54] BUS BAR ASSEMBLY, FASTENING SYSTEM THEREFOR, AND METHOD

[75] Inventor: Jacques Chauquet, Ayse-Bonneville, France

[73] Assignee: Erico International Corporation, Solon, Ohio

[21] Appl. No.: 556,582

[22] Filed: Nov. 13, 1995

[51] Int. Cl.$^6$ .................. F16B 5/06; H01R 4/38
[52] U.S. Cl. .......... 403/384; 403/24; 403/408.1; 174/88 B; 439/213; 411/396
[58] Field of Search ............... 403/384, 385, 403/389, 395, 396, 24, 184, 408.1; 174/88 B, 70 B, 72 B, 71 B; 411/396, 388, 522; 439/212, 213, 210

[56] References Cited

U.S. PATENT DOCUMENTS

| 1,694,326 | 12/1928 | Klausner | 411/396 |
|---|---|---|---|
| 2,993,254 | 7/1961 | Larson | 403/396 X |
| 3,380,786 | 4/1968 | Peterson | . |
| 3,984,191 | 10/1976 | Doty | 411/522 X |
| 4,627,680 | 12/1986 | Weimer et al. | 174/88 B X |
| 4,886,940 | 12/1989 | Gagnon et al. | 174/88 B |
| 5,364,203 | 11/1994 | Ishikawa | . |
| 5,577,301 | 11/1996 | De Maagd | 411/522 X |

FOREIGN PATENT DOCUMENTS

| 392137 | 3/1924 | Germany | 411/522 |
|---|---|---|---|
| 1261217 | 2/1968 | Germany | . |
| 2061680 | 6/1972 | Germany | . |
| 1325213 | 7/1989 | U.S.S.R. | 411/396 |
| 4821 | 4/1886 | United Kingdom | 411/522 |
| 633345 | 12/1949 | United Kingdom | 403/396 |
| 2146092 | 4/1985 | United Kingdom | 248/74.1 |

OTHER PUBLICATIONS

European Search Report dated Feb. 27, 1997, for European Patent Application No. 96118193.0.

*Primary Examiner*—Harry C. Kim
*Attorney, Agent, or Firm*—Renner, Otto, Boisselle, Sklar

[57] ABSTRACT

A bus bar panel system utilizes a quick acting and simplified fastening system for making connections. The bus bar is preferably pre-perforated along the edges, although holes may be drilled at the time of fastening. The fastening system uses a stud having threads on one end for receiving the usual washers and nut. On the other end, usually away from the installer, the stud is provided with flats which engage an open slot or yoke on a keeper clip. The clip has a gauge flange to engage the edge of the bar or clamp through which the stud extends. The transverse dimensions of the open slot are related to the flats and the length of the slot to the distance of the perforations from the edge of the bar. The clip also includes a spring section which grabs the end of the stud holding the clip in place so that the installer has both hands free to secure the nut and washers. The clip, while providing the requisite area and stiffness for a good electrical connection, occupies very little space axially of the stud to fit between bars of a common phase. A wide variety of connections may be made more easily with fewer parts less apt to be dropped in locations which would normally require partial disassembly of the panel system or housing.

16 Claims, 5 Drawing Sheets

BUS BAR ASSEMBLY, FASTENING SYSTEM THEREFOR, AND METHOD

DISCLOSURE

This invention relates generally as indicated to a bus bar assembly, fastening system therefor, and method, and more particularly to an electrical panel construction using a fastening system which can be inserted or installed in close quarters with fewer parts and without disassembly for access.

BACKGROUND OF THE INVENTION

High current relatively low voltage power transmission from transformers or generators to using apparatus such as welders or motors frequently employs bus bars which usually extend through enclosures and through enclosed panels where branches or connections are made. Most such power transmission is a three phase system or a three phase and neutral system. Each phase and the neutral are laterally spaced. The spacing between phases and the neutral may be from about 50 to about 90 mm. If each phase is a multi-bar system or more than a single bar, such as three bars, then the phase spacing is usually measured from the center bar thus reducing the open spacing between phases. In a multi-bar phase, the spacing between bars within a phase is much less. For copper bars, the lateral spacing between bars in a given phase may run from about 4 to about 15 mm, depending on a number of factors such as bar size. A typical lateral spacing dimension within a phase would be on the order of 5mm.

In the construction of such systems, safety panel enclosures are required and sometimes the multi-bar three phase system has to be constructed in the panel enclosure, although it is more convenient to construct the enclosure after the system is assembled. However, if the system needs to be modified or adjusted after assembly, connections will need to be installed or removed within the enclosure. Such enclosures usually have front access doors, but fixed back, side and top walls. They present cramped quarters, may not be well lighted, and make it extremely difficult to create or remove connections such as shunts, lugs, or bars. The problem is complicated not only by the space requirements, but also by the type of connection which has to be made. High contact pressure is necessary to obtain a good electrical connection and yet concentrated pressure can cause deformation of the bus bar which can cause loosening of the connection. Also, care must be taken that there is not an excess of steel against the bus bar which can lead to unwanted heat rise. Too much steel leads to magnetic conditions which causes heat rise. Excess heat may also cause condensation and corrosion.

Conventional fastening systems utilize nut and headed bolts with flat washers. While the fastening to bus bars is much easier with perforated bus bar having edge holes at predetermined edge and length spacing, such as sold by ERICO FRANCE of Andrezieux-Boutheon, France under the trademark ERIFLEX®, the tight spacing and cramped quarters nonetheless creates many problems. In order to make the proper connection or alteration, it is sometimes necessary to disassemble the system or the enclosure or both.

Since a headed bolt cannot be inserted in the space between bars of the same phase because of the close spacing (5 mm e.g.), it has to be inserted through all three bars of a three bar phase. If the connection is made between two of the three bars, a spacer is required between the two bars and the third. Two spacers may be required if the connection is made to the outside of an outside bar since the fastener has to go through all three bars. At the least, the fastening system requires a bolt, nut, four washers and one or two spacers, as well as two wrenches, one of which may be a torque wrench.

For a four bar phase, the problems and ports are multiplied. For unperforated bar, the installer must also drill precisely aligned holes through the bars and spacers and make sure that the clamped or stacked surfaces are burr, oxide, and grease free.

In such panel systems, the enclosure should remain clean and free of debris. Lost or dropped parts, which occur frequently, should be found and removed. Needless to say, retrieval of lost or dropped parts, or disassembly of the cabinet or panel bus bar system is time consuming. The making and fitting of spacers also adds to the cost. It would, accordingly, be desirable to have a bus bar fastening system which could be used in tight quarters and which could be installed quickly and conveniently from the front or open side of the panel cabinet without requiring so many parts and tools, and which would meet all of the pressure and other requirements to make a high quality electrical connection.

SUMMARY OF THE INVENTION

The bus bar assembly and fastening system comprises a headless stud threaded on one end for application of the contact washer, flat washer and nut found in conventional systems. The opposite end of the stud is provided with diametrically opposed symmetrical flats, spaced slightly from such opposite end, each of which flats provides a stop shoulder at both ends. The length of the stud from the threaded end section to the flats varies depending on the application. The length may be such to extend appropriately through a single bar, two bars, three bars, or all four bars, of one phase, and whatever is clamped or connected thereto.

A clip which includes a keeper slips over the edge of a bar and includes a yoke or open slot interfitting with such flats, both to keep the stud from moving axially and also from rotating about its axis. Rotation of the keeper is prevented by a short gauge flange which seats against the edge of the bar or other object clamped. The open slot or yoke extends normal to the gauge flange. The slot of the keeper has pilot surfaces to make it easy to assemble the keeper and stud. A spring clip is assembled with the keeper and engages the opposite end of the stud just beyond the flats to keep the keeper in place once assembled on the stud simply by pushing the keeper over the stud flats with finger pressure. The spring clip includes two spaced short parallel pressure flanges which embrace the stud. The keeper and clip are thus held in place with the gauge flange against the gauging edge of the bar or other object.

Assembly is easily accomplished even though the installer cannot feel or even see the flatted end of the stud. The keeper clip will readily fit between the bars even though a finger even without gloves won't. With the threaded one end of the stud projecting toward the installer, or at least visible to the installer, both hands are free to assemble whatever is being attached, the contact washer, flat washer, and nut, for proper tightening. The keeper body, at the proper torque, will be drawn against the bus bar surface at the proper clamping pressure and has an area and stiffness to distribute the clamping pressure without concentrating it around the hole in the bar at the stud.

The present invention allows the fixation between the bars or to bars without spacers between the bars, and more importantly, without a headed bolt, with washers being required to be inserted through bars and spacers from the rear, and out of sight, or requiring a nut and washer assembly to be threaded on by feel and then wrench tightened. The present invention may be assembled and tightened with only one wrench and even where there is no access on one side. The keeper provides the correct contact pressure even with reduced transverse dimensions as opposed to the diameter of a contact washer. The keeper also resists bending of the bar or bar clamp, or lug, for example, which may be used in conjunction with the bar. It also suppresses heat rise and the resulting problems. The system may be used with or without the stud passing through bar holes and facilitates the attachments of cables or jumpers, for example, with crimped lugs to the bars. With a special grooved clamp washer, wires or small cables may quickly be attached to the bar or other conductive surface. Importantly, the system significantly reduces the number of parts and minimizes the dropping or losing of parts. At the same time, the system enables quick and easy connection without spacers in locations which could not be utilized before since conventional fasteners would not fit, and it was simply too much trouble to disassemble the cabinet or panel system to make the connection.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
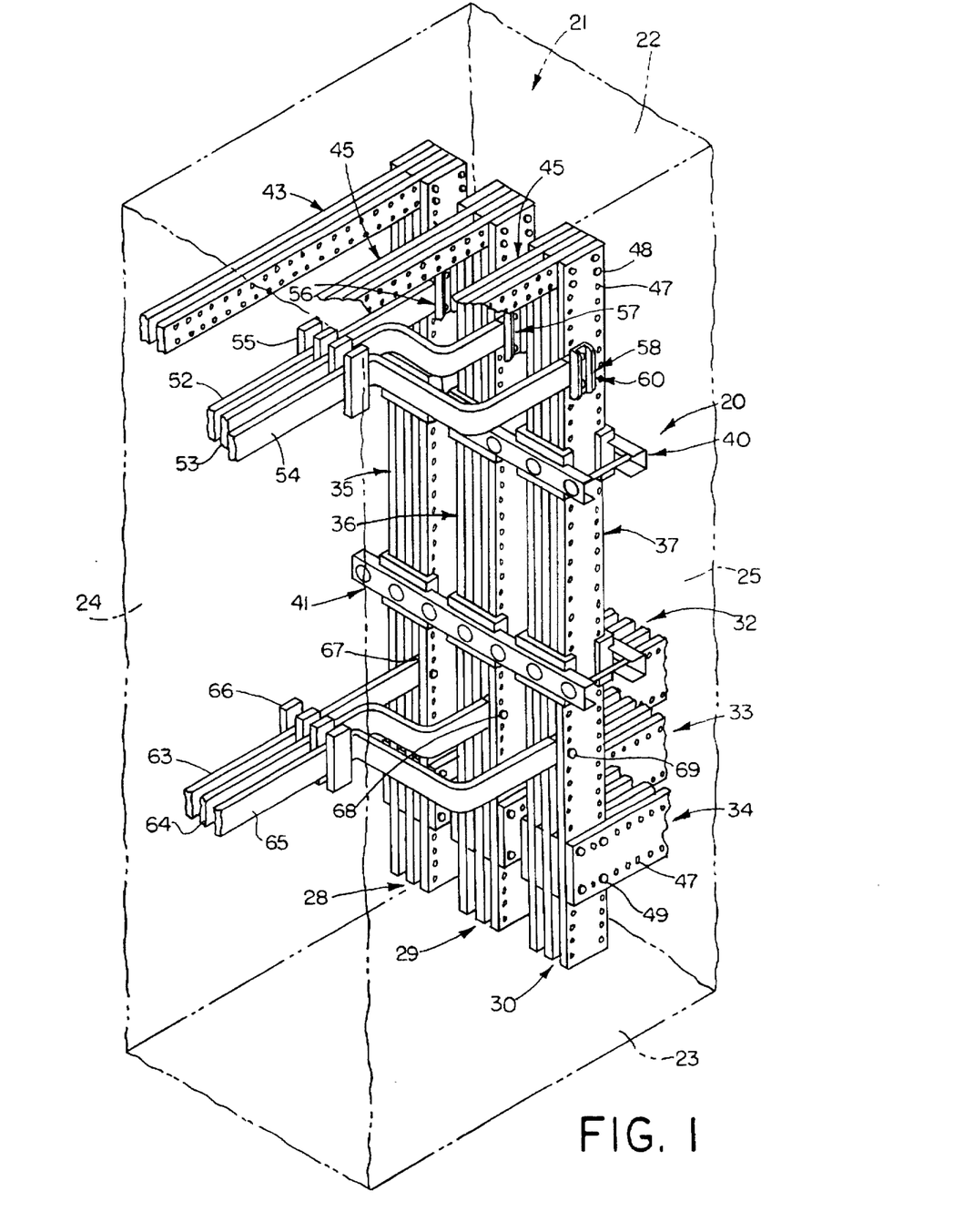
FIG. 1 is a fragmentary illustration of a portion of a bus bar panel system illustrating the present invention.

Referring initially to FIG. 1, there is illustrated a portion of a bus bar panel system shown generally at 20 which is normally situated within a cabinet or enclosure 21. The cabinet includes a top 22, a bottom 23, a backwall 24 and a front 25, the latter usually being provided with doors providing access to the panel system. The cabinet normally includes a frame and the doors are normally smaller than the front of the cabinet. Access to such cabinet is normally only through the front doors unless the top or back is disassembled.

The bus bar panel system illustrated is a typical three phase system with the three phases being shown at 28, 29 and 30. As illustrated, each phase is a multi-bar phase and in the illustration, the three phases enter from the right hand side of FIG. 1 near the bottom in four bar phases seen at 32, 33 and 34, respectively. Such horizontal runs at the bottom of the panel are connected to vertical runs of three bars each seen at 35, 36 and 37, respectively. The bus bars of each phase are held in place by bus bar supports seen at 40 and 41 which support, grip, and maintain the spacing of the bars, both between phases and within a given phase. From the top of the vertical runs, the phases continue with two bar runs shown at 43, 44 and 45. As illustrated, the various runs of the bus bar panel system are constructed preferably with perforated bus bar of the type sold by ERICO FRANCE, under the registered trademark ERIFLEX®. Such bus bar has perforations or holes spaced relatively close to the edge on generally uniform centers as seen at 47. Such holes facilitate the fastening and clamping of the various connections and make use of the fastening system of the present invention somewhat easier. The horizontal and vertical runs of the multi-bar phases illustrated in FIG. 1 are interconnected by fasteners shown generally at 48 and 49 in accordance with the present invention.

FIG. 1 also illustrates the connection of three flexible bus bars 52, 53 and 54 which extend through spacers 55, and which are connected to the respective phases at 56, 57 and 58, respectively. The bus bars may be of the insulated flexible type such as sold by ERICO FRANCE, under the registered trademark FLEXIBAR®. Such flexible insulated bus bars are illustrated, for example, in Applicants French Patent No. 81 23417. Each of the respective flexible bus bars is connected to the face of the bar in the three bar phase set facing the viewer. Each of the connections utilizes a brass clamp 60 and the fastening system of the present invention.

Near the bottom of the vertical run, three flexible bus bars indicated at 63, 64 and 65 extend through spacers 66 and are connected at 67, 68 and 69 to the three bar vertical runs of each phase. Each flexible bus bar is connected between two of the three bars in each phase utilizing the fastening system of the present invention. The flexible bus bars extend to connections for utilizing apparatus and the bus bar panel in its entirety is usually more crowded and complex than FIG. 1 would indicate. As noted above, the spacing between the phases may vary from approximately 50 to 90 mm and be even less with multi-bar phases. However, the spacing between the bars in a given phase may typically be only 5 mm or somewhat more, and connections such as shown at 56–58 or 67–69 would normally require a fastener inserted through all bars of the phase with spacers between the side-by-side bars within a given phase.

Referring now to FIG. 2–7, there is illustrated the basic components of the fastening system of the present invention. The fastening system includes a stud 72 which has a threaded section 73 on one end and parallel diametrically opposed flats 74 and 75 on the other end. The flats are quite close to the other or projecting end indicated at 76. The system includes a conventional flat washer 77, a dished contact washer 78, and a nut 79 having internal threads 80 matching the threads 73.

Figure 2:
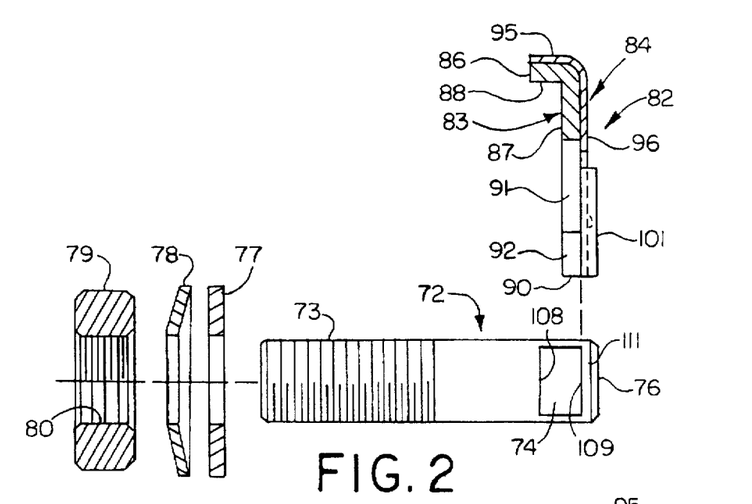
FIG. 2 is an exploded view of the components of the fastening system.
Figure 3:
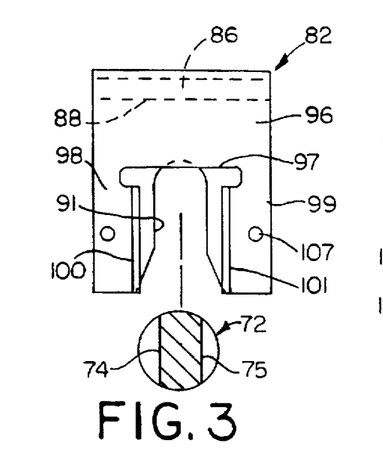
FIG. 3 is an exploded view taken from the right hand side of FIG. 2.

Also included is a two part keeper clip shown generally at 82 which includes a keeper 83 and a spring clip 84 which parts are connected to each other. The keeper includes a relatively short gauge flange 86 and a major body portion 87 extending at a right angle to the gauge flange 86. As hereinafter described, the interior of the gauge flange seen at 88 is designed to engage the edge of the bus bar with the body 87 extending parallel to the face of the bus bar.

The edge 90 of the body farthest from the gauge flange includes an open slot 91, the interior of which at the edge 90 includes tapered pilot surfaces 92 and 93. These are seen more clearly in FIG. 5.

Figure 4:
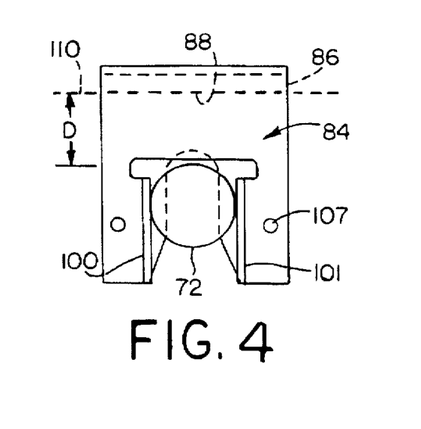
FIG. 4 is similar view showing the parts assembled.

Similarly, the spring clip 84 includes a relatively short flange 95 and a body 96 which includes a cut-out 97 forming two legs 98 and 99. The inner edges of the two legs are bent outwardly to form spring lips 100 and 101, respectively, which as indicated in FIGS. 3 and 4, are spaced wider than the slot 91 in the keeper body, but slightly more narrow than the diameter of the stud. The spring portion of the clip may be made of relatively thin spring steel while the thicker keeper may be made of simple sheet steel.

Figure 5:
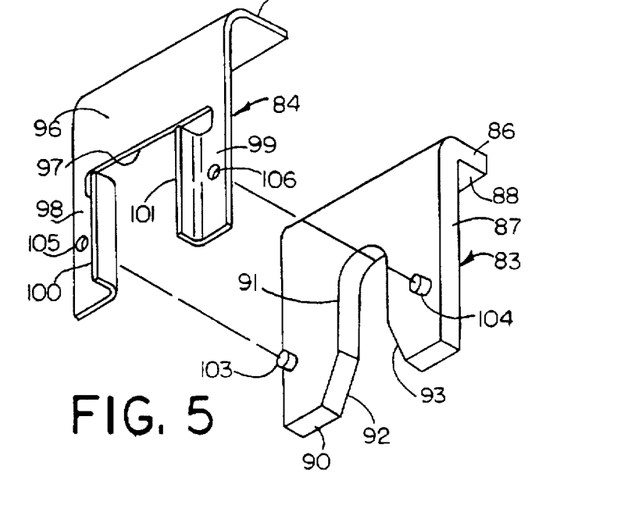
FIG. 5 is an exploded view of the two components of the keeper clip.
Figure 6:
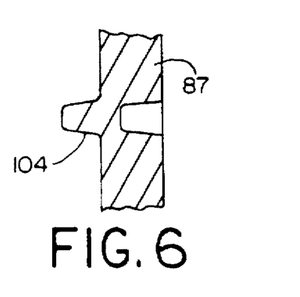
FIG. 6 is an enlarged fragmentary section of the keeper showing the formation of a rivet stud.
Figure 7:
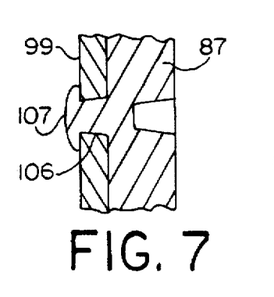
FIG. 7 is a similar fragmentary view after riveting.

The spring clip and the keeper may be joined in a variety of ways. In FIGS. 5, 6 and 7, there is illustrated rivet studs 103 and 104 which may be formed in the keeper body by punching from the opposite side. The rivet studs may extend through holes 105 and 106 in the legs of the spring clip and are flattened as indicated at 107. The spring clip and keeper may be joined in a variety of other ways, such as by tack welding. When the parts are joined, it is important that the lips of the spring clip be parallel and centered with respect to the slot 91.

Referring back to FIGS. 2 and 3, it will be seen that the flats 74 and 75 each form two stop shoulders seen at 108 and 109. In operation, the stud is inserted through a hole in the bus bar until the end 76 projects slightly from the bus bar. The keeper clip is then inserted behind the bus bar and pushed down until the gauge flange interior 88 contacts the edge of the bus bar seen at 110 in FIG. 4. The open slot 91 straddles the stud flats as indicated in FIG. 3 and is pushed to its seated position when the underside of the gauge flange 88 contacts the edge of the bus bar 110. As it moves to its seated position, the spring lips 100 and 101 embrace the relatively short portion 111 of the stud extending beyond the shoulder 109 in FIG. 2 gripping or grasping the stud. This enables the installer to release the clip without fear of it dropping or falling off leaving both hands free to form the connection and install the washers 77 and 78 as well as the nut 79.

As seen in FIG. 4, it is noted that the clip has to extend beyond the distance D which is the distance from the interior of the gauge flange to the stud. It is also the distance from the outer edge of the holes or perforations in the bus bar to the edge of the bus bar. The body of the clip has to exceed such distance in order to interengage with the stud.

It can be seen, of course, that the keeper body extends considerably beyond such distance straddling the flats and that the area of the keeper body in pressure contact with the face of the bus bar is substantially greater than the area of the nut and washer system, and yet the width of the keeper body measured lengthwise of the bus bar is less than the diameter of the washer 77.

Figure 8:
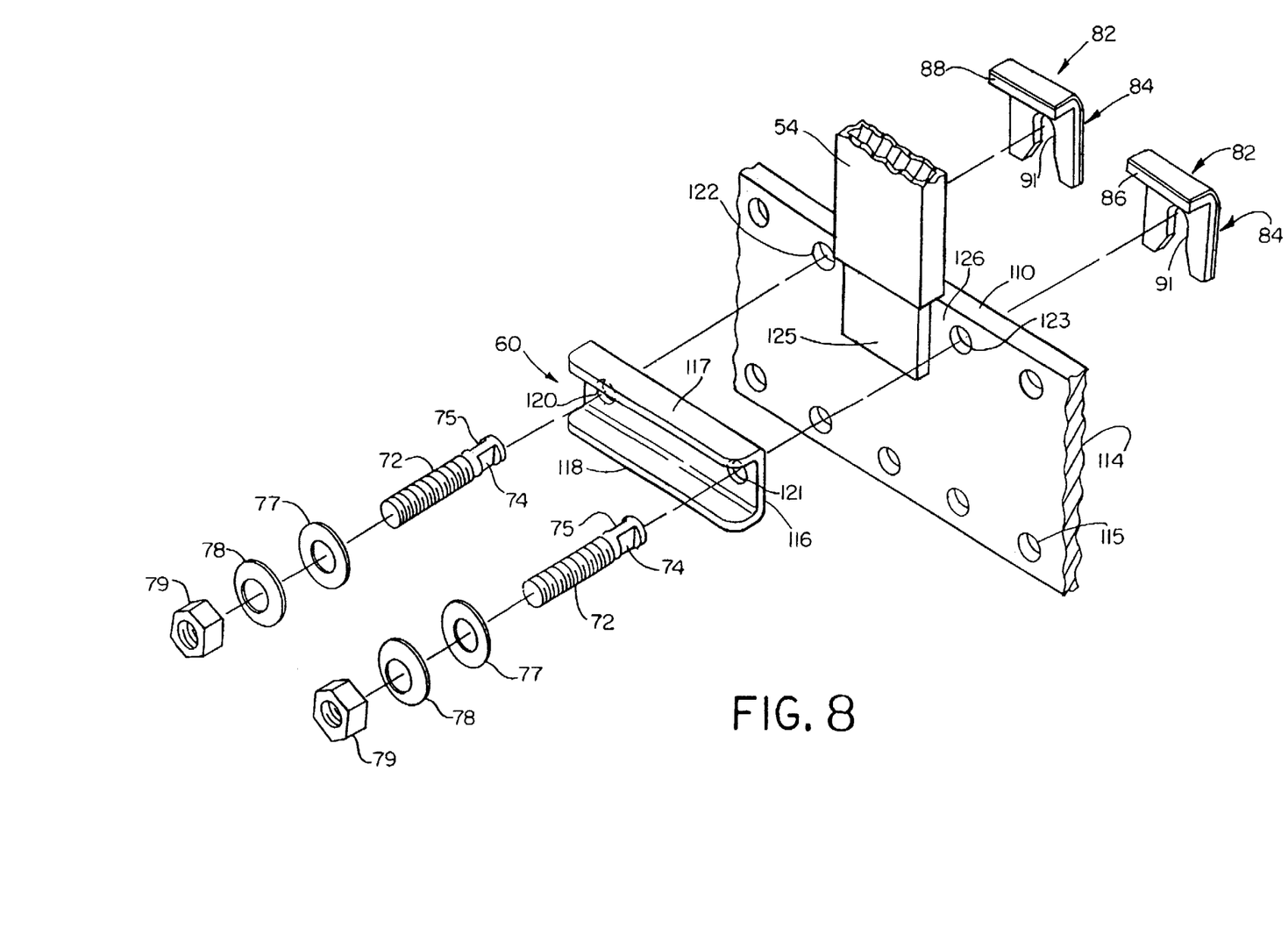
FIG. 8 is an exploded view of the clamp attachment of a flexible bus bar to the side of a perforated bus bar.

Referring now to FIG. 8, there is illustrated in more detail a connection like that shown at 58 in FIG. 1. The connection joins insulated bus bar 54 to the perforated bus bar 114 which has the perforations 115 therein on uniform centers along each edge, again each perforation being spaced the distance D from the edge as seen in FIG. 4. The brass clamp shown at 60 is simply a rigid brass channel having ends 116, two upturned edge flanges 117 and 118, and holes 120 and 121 in each end which are spaced from the ends 116 of the channel the same distance D as the holes 122 and 123 in the bus bar 114 are spaced from the edges. The installer to the left front of FIG. 8 simply inserts the studs 72 through the holes 122 and 123 and slips the keeper clips 82 in place behind the bar straddling the flats 74 and 75. The spring portion of the keeper clips maintains the clips in place leaving the installer with both hands free to position the insulated bus bar 54 flat against the face of the perforated bar 114 and to place the clamp 60 on the projecting studs, and finally the washers and nuts firmly and uniformly to clamp the uninsulated projecting end 125 of the bus bar 54 against the bus bar face at 126. The uniform tightening of the nuts will achieve the desired and correct clamping pressure to obtain a proper electrical connection between the bus bar 114 and the flexible bus 54.

Figures 9, 10, 11, 12:
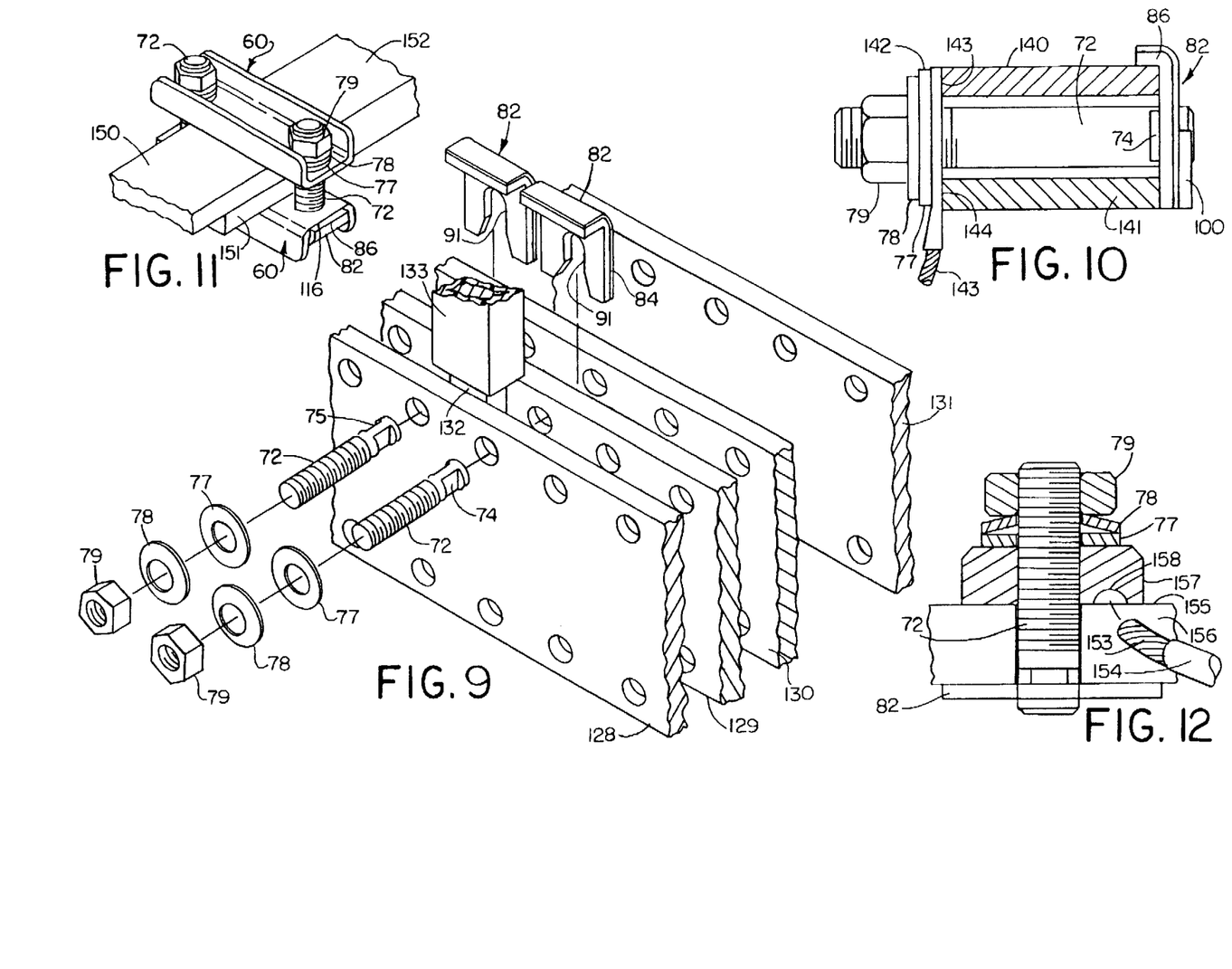
FIG. 9 is an exploded view showing the attachment of a flexible bus between two bars of a three bar phase.
FIG. 10 is a transverse section through two bars illustrating the attachment of a jumper lug to the bar edges.
FIG. 11 is a fragmentary view of a bar joined to a flexible bar using the fastening system of the present invention.
FIG. 12 is a fragmentary illustration of the clamping of wire or cable to the face of a bar.

In FIG. 9, there is illustrated the three bars of one phase seen at 128, 129 and 130, while the first bar of the next phase is seen at 131. The spacing between the bars of a common phase is quite close and as indicated may be on the order of approximately 5mm. The spacing to the next phase is substantially larger.

As in FIG. 9, the bare portion 132 of the flexible bus 133 is inserted between the bars 128 and 129. The studs 72 are inserted through the appropriate holes in the bus bar on each side of the bare end of the insulated bus bar and the keeper clip assemblies are inserted between bars 129 and 130 to engage the flats of the studs. The washers and nuts are then assembled to clamp the insulated bus between the bars 128 and 129 of a common phase. No spacer is required between the bars 129 and 130 as would normally be required with a conventional fastening system.

FIG. 10 illustrates the fastening system of the present invention in a somewhat different application. FIG. 10 illustrates two parallel bus bars 140 and 141 with the swaged lug 142 of cable 143 attached to the ends or edges of the bar seen at 143 and 144. The lug bridges the edges of the bars and includes a hole accommodating the stud 72. The keeper clip simply takes the place of an enlarged stud head and two washers on the opposite end, but the headless stud 72 enables the stud to be inserted from the left rather than the right as seen in FIG. 10. Moreover, the clip may be installed simply by bringing the gauge flange into engagement with the face of the bar 140 at the edge. Again, the spring lips 100 and 101 maintain the keeper in place to enable the installer to use both hands to assemble the lug, washers and nut on the threaded projecting end of the stud.

In FIG. 11, there is illustrated a splice between what may be a rigid bus bar 150 and the bare end 151 of insulated bus bar 152. Two brass clamps 60 are employed on opposite sides of the lap splice and two studs and two keeper clips. As illustrated, the headless studs are inserted from the top as seen in FIG. 11 and the keeper clips are installed by sliding the clips between the channel flanges until the gauge flange 86 engages the end 116 of the brass clamp. As indicated, the hole in the brass clamp is preferably spaced from the end, again the distance D, so that the keeper clip can easily be inserted by sliding it over the end of the brass clamp until the spring portion of the clip grasps the end of the stud when the gauge flange is in engagement with the end 116 of the brass clamp. Uniform tightening of the nuts will provide good electrical contact between the bus bars.

In FIG. 12, the fastening system of the present invention is employed to attach the bare end 153 of a cable 154 to the face 155 of bus bar 156. To do this, a disc 157 is provided which has a half round radial or chordal groove 158 in its interior face. With the bare end 153 of the cable or wire 154 inserted in the groove, the tightening of the nut 79 will firmly press the bare end against the face 155 of the bus bar 156. Again, the keeper 82 is employed behind the bus bar or on the opposite face.

Figure 13:
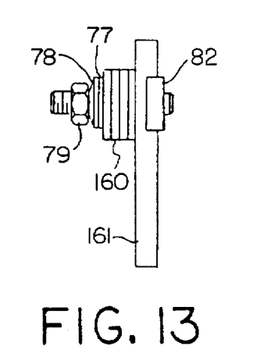
FIGS. 13–18 are schematic illustrations of the variety of connections which can be made to or between bus bars with the present invention.
Figure 14:
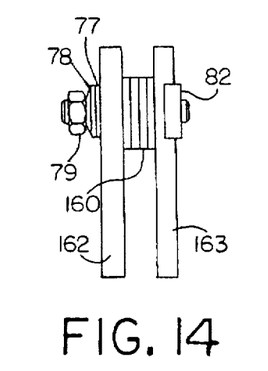
Figure 15:
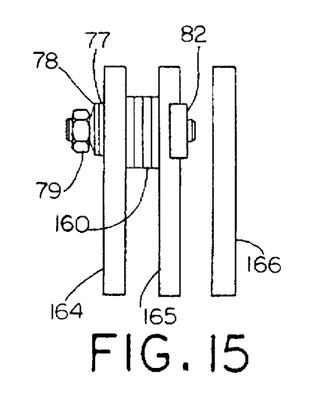
Figure 16:
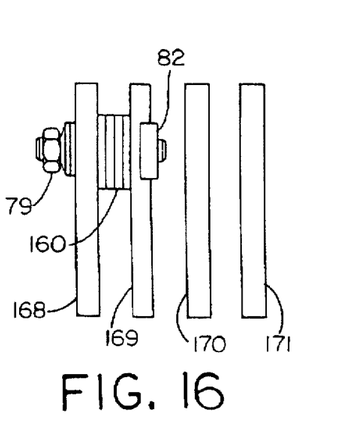
Figure 17:
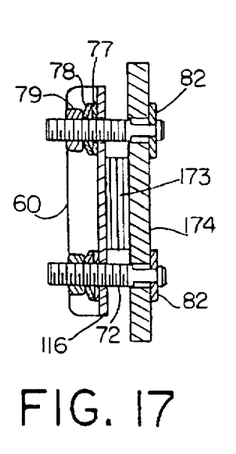

Referring now to FIGS. 13, 14, 15 and 16, there is illustrated a flexible bus 160 fastened to a single bar 161 in FIG. 13, between two bars 162 and 163 in FIG. 14, and between two of three bars 164, 165 and 166 in FIG. 15. In FIG. 16, the flexible bus is inserted between two bars of a four bar phase seen at 168, 169, 170 and 171. In the multi-bar system seen in FIGS. 14, 15 and 16, a headed fastener would normally have to be inserted from the right hand side of all of the bars in the phase because there simply is not space between the bars in the phase to insert a headed fastener. For a four bar phase, the fastener would have to be of substantial length and may even be too long even to fit between two phases which would then require partial disassembly of either a phase or the enclosure for the panel. In the case of unperforated bar, all of the bars would have to be drilled and spacers would be required between bars 165 and 166 in FIG. 15 and also between bars 169, 170 and 171 in FIG. 16 to achieve the proper clamping pressure. In FIG. 17, there is illustrated a brass clamp 60 clamping a flexible bus 173 to the face of bus bar 174. The brass clamp 60 bridges the flexible bus and clamps it to the face of the bus bar. As previously indicated, the keeper 82 may be utilized either with the bus bar 174 gauging on the edge, or with the brass clamp gauging on the end 116.

Figure 18:
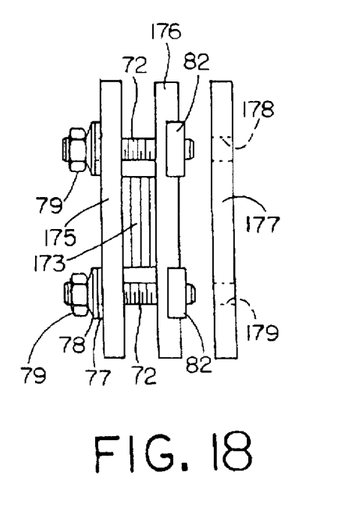

FIG. 18 illustrates a flexible bus 173 clamped between two bars 175 and 176 of a three bar phase which includes bar 177. It can be appreciated that if the bars are perforated as indicated at 178 and 179, it makes the use and installation of the fastener system much more expedient since otherwise holes would have to be drilled both in the bar and in spacers, and the surfaces prepared for the fastening system to achieve the desired electrical connection.

The dimensions of the fastening system may vary, and particularly the length of the stud. For example, the length of the stud may vary from approximately 35 to approximately 70 mm. The length of the threaded section may vary from approximately 26 to about 61 mm while the axial length of the flats may be on the order of from about 3 mm to about 5 mm, while the thickness of the keeper body is about 2 mm. The overall thickness of the body including the spring lips is on the order of 4 mm which enables it readily to slip between bus bars which are spaced only 5 mm apart.

It can now be seen that there is provided in combination a bus bar which has a hole spaced from the edge a distance D and the fastening system which includes a stud adapted to extend through the hole, and a keeper interfitting with the stud. The keeper has a short gauge flange adapted to engage the edge of the bar and a body projecting normal to the gauge flange which extends greater than the distance D from the interior of the gauge flange to interfit with the stud. The fastening system includes a headless stud having threads on one end and flats on the other whereby the flatted end may be inserted through the hole in the bus bar with the threaded end projecting toward the installer. The clip is then adapted to be slipped behind the bus bar to engage the flats and grip the stud so that the installer may then have both hands free to make the connection. The present invention avoids the losing and dropping of parts within the cabinet, substantially reduces the number of parts needed to make such connections, and actually improves the quality of the electrical connection by distributing the clamping force of the connection over a larger area of the face of the bar. There is, however, insufficient steel in the fastening system to create heat problems.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A fastening system for bus bar panels comprising a headless stud having threads on one end and at least one flat on the other end whereby the flatted end may be inserted through a hole in a bus bar with the threaded end projecting toward the front, and a clip adapted to be slipped behind the bus bar to engage the flat whereby a nut and washer assembly may be used on the threads to make a bus bar connection, including at least three closely spaced parallel bars in the panel forming a phase, the flatted end extending between at least two bus bars of the phase to make a connection between said two bars, said clip extending between the second and third bar.

2. A fastening system for bus bar panels comprising a headless stud having threads on one end and at least one flat on the other end whereby the flatted end may be inserted through a hole in a bus bar with the threaded end projecting toward the front, and a clip adapted to be slipped behind the bus bar to engage the flat whereby a nut and washer assembly may be used on the threads to make a bus bar connection, including a gauge flange on said clip adapted to engage the edge of said bus bar to be properly positioned to engage said flat.

3. A fastening system as set forth in claim 2 wherein said flat is spaced slightly from said other end and said clip and includes means to grasp said other end beyond said flat.

4. A fastening system as set forth in claim 3 wherein said clip includes a rigid flat body to distribute clamping pressure over a substantial area of the bus bar.

5. A fastening system as set forth in claim 4 including diametrically opposed flats on said stud.

6. A fastening system as set forth in claim 5 including an open slot in said body normal to the gauge flange adapted to straddle the stud and engage both flats.

7. A fastening system as set forth in claim 6 including a spring clip attached to said body to grasp the stud when the clip is in proper position.

8. A fastening system as set forth in claim 7 wherein said spring clip include two spring lips generally parallel to said slot.

9. An electrical fastening system for bus bar panels comprising a bus bar having a hole and a headless stud having threads on one end and at least one flat on the other end whereby the flatted end may be inserted through said hole in said bus bar with the threaded end projecting toward the front, and a clip adapted to be slipped behind the bus bar to engage the flat whereby a nut and washer assembly may be used on the threads to make a bus bar electrical connection.

10. A fastening system for making connections to bus bar comprising a headless stud having a threaded end, a stop shoulder on the opposite end, said stud being adapted to extend through a hole in said bus bar, and a keeper clip adapted to be positioned on the edge of the bus bar and interfit with said shoulder whereby a nut and washer assembly tightened on said threaded end may form a clamp connection to the bus bar, wherein said keeper clip includes a gauge flange adapted to engage the edge of the bar for proper positioning of the clip to interfit with the shoulder.

11. A system as set forth in claim 10 wherein said stud includes diametrically opposite flats forming symmetrical stop shoulders, and said clip includes a rigid keeper plate having an open slot straddling and properly engaging said flats as determined by said gauge flange.

12. A system as set forth in claim 11 wherein said clip includes a spring section adapted to embrace the stud to hold the keeper clip in position when said keeper clip properly interfits with said stud.

13. A system as set forth in claim 12 wherein said spring section includes opposed spring lips.

14. A fastening system for making connections to bus bar comprising a headless stud having a threaded end, a stop shoulder on the opposite end, said stud being adapted to extend through a hole in said bus bar, and a keeper clip adapted to be positioned on the edge of the bus bar and interfit with said shoulder whereby a nut and washer assembly tightened on said threaded end may form a clamp connection to the bus bar, including a rigid clamp bar having holes at each end, each to receive one of said studs to facilitate clamping against said bus bar.

15. A fastening system for making connections to bus bar comprising a headless stud having a threaded end, a stop shoulder on the opposite end, said stud being adapted to extend through a hole in said bus bar, and a keeper clip adapted to be positioned on the edge of the bus bar and interfit with said shoulder whereby a nut and washer assembly tightened on said threaded end may form a clamp connection to the bus bar, including a disc having a semicircular groove in one face clamping a conductor to the face of said bus bar when said disc is clamped to the face of said bus bar by the tightening of said nut.

16. An electrical fastening system for making connections to bus bar comprising a bus bar having a hole and a headless stud having a threaded end, a stop shoulder on the opposite end of said stud, said stud being adapted to extend through said hole in said bus bar, and a keeper clip adapted to be positioned on the edge of said bus bar and interfit with said shoulder whereby a nut and washer assembly tightened on said threaded end may form a clamp to make an electrical connection to said bus bar.

* * * * *